UNITED STATES PATENT OFFICE.

OTTO NICHOLAS WITT, OF WESTEND-CHARLOTTENBURG, NEAR BERLIN, ASSIGNOR TO THE BADISCHE ANILIN AND SODA FABRIK, OF MANNHEIM, GERMANY.

DARK-BLUE DYE.

SPECIFICATION forming part of Letters Patent No. 420,374, dated January 28, 1890.

Application filed August 3, 1889. Serial No. 319,680. (Specimens.) Patented in France April 11, 1889, No. 197,396.

*To all whom it may concern:*

Be it known that I, OTTO NICHOLAS WITT, a citizen of Switzerland, residing at Westend-Charlottenburg, near Berlin, in the Kingdom of Prussia and Empire of Germany, have invented new and useful Improvements in Dye-Stuffs or Coloring-Matters, (for which I have obtained a patent in France, No. 197,396, bearing date April 11, 1889,) of which the following is a specification.

This invention relates to the manufacture of new azo colors, which are principally distinguished from the azo colors hitherto known by their property of producing colored lakes or compounds with metallic mordants in a similar manner to alizarine and allied coloring-matters.

My new azo colors are all produced either from the known beta-naphthohydroquinone or from the beta-naphthohydroquinone-beta-sulphonic acid (a substance forming the subject-matter of a separate application for Letters Patent) by allowing one molecule of either of the said substances to react upon one molecule of an aromatic diazo compound.

I shall now proceed to describe the production of a coloring-matter resulting from the combination of one molecule of beta-naphthohydroquinone-beta-sulphonic acid with one molecule of the so-called "Dahl's" alpha-naphthylamine-disulphonic acid. (German Letters Patent No. 41,957.)

In carrying out my invention I dissolve about thirty-five (35) parts, by weight, of the neutral sodium-salt of the above-named "Dahl" alpha-naphthylamine-disulphonic acid in about five hundred (500) parts, by weight, of water. I then add about seventy (70) parts, by weight, of hydrochloric acid of about 1.12 specific gravity, and gradually run in an aqueous solution of about seven and two-tenths (7.2) parts, by weight, of sodium-nitrite (in about twenty-five parts of water.) The difficultly-soluble diazo compound thus formed is mechanically separated from its mother-liquor, and then in small portions at a time and under constant agitation added to a solution of about twenty-seven (27) parts, by weight, of the ammonium-salt of beta-naphthohydroquinone-beta-sulphonic acid in about one hundred and sixty (160) parts, by weight, of water, in which about twenty (20) parts, by weight, of crystallized sodium-acetate are previously dissolved. By operating in this manner a red solution will be obtained, from which the coloring-matter is separated by adding thereto sodium-chloride in sufficient quantity. I then collect the precipitate thus formed upon a filter.

My new coloring-matter, prepared as above described, presents the following characteristic properties: In its dry state it has the appearance of a brown powder. Its composition corresponds to the formula—

$$C_{10}H_5(SO_3Na)_2-N=N-C_{10}H_5(OH)_2$$

It is easily soluble in cold water. The solution possesses a yellowish-red color. Upon the addition of hydrochloric acid to this aqueous solution no precipitate is produced unless a very large excess of the said acid be added.

My coloring-matter dissolves in concentrated sulphuric acid with a bluish-purple color. If caustic-soda liquor be added to a moderately-concentrated aqueous solution of the coloring-matter, the above-described yellowish-red color of the same turns first into a bright and intense bluish-green, which then slowly becomes destroyed upon the access of air or upon the addition of water. This change having taken place, the coloring-matter itself has undergone decomposition. Carbonated alkalies cause a similar destruction.

My coloring-matter produces a dark-blue color in dyeing upon wool with the aid of a chrome mordant, while alumina mordants may be used for the production of bluish-purple shades.

My coloring-matter is soluble in alcohol, but insoluble in benzine.

What I claim as new, and desire to secure by Letters Patent, is—

As a new product, the coloring-matter or dye-stuff, hereinbefore described, resulting from the combination of one molecule of the so-called "Dahl's" alpha-naphthylamine-disulphonic acid with one molecule of beta-naphthohydroquinone-beta-sulphonic acid, and having the following characteristics: In its dry state it appears under the form of a brown powder, the composition of which corresponds to the formula $$C_{10}H_5(SO_3Na)_2-N=N-C_{10}H_5(OH)_2,$$

and which is easily soluble in cold water, the aqueous solution not becoming precipitated by the addition of hydrochloric acid unless a very large excess of the same be added, while the addition of caustic alkalies causes the yellowish-red color of the solution to turn into a bright and intense bluish-green, which slowly fades, (a destruction of the coloring-matter thus taking place,) the coloring-matter dissolves in concentrated sulphuric acid with a bluish-purple color, and produces in dyeing, with the aid of chrome mordants, dark-blue shades, and with the aid of alumina mordants bluish-purple shades.

In testimony whereof I have hereunto set my hand in the presence of two subscribing witnesses.

OTTO NICHOLAS WITT.

Witnesses:
GEO. H. MURPHY,
RUDOLF ZAERTLING.